United States Patent
Krueger

(10) Patent No.: US 6,385,526 B1
(45) Date of Patent: May 7, 2002

(54) VEHICLE TRACTION CONTROL WITH POWER SHIFT MODIFICATION

(75) Inventor: Eric Edward Krueger, Ann Arbor, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/690,103

(22) Filed: Oct. 16, 2000

(51) Int. Cl.[7] ............................................. B60K 28/00
(52) U.S. Cl. .............................. 701/84; 701/87; 701/90; 180/197
(58) Field of Search ......................... 701/82, 83, 84, 701/85, 86, 87, 90; 180/197

(56) References Cited

U.S. PATENT DOCUMENTS

| | | | | |
|---|---|---|---|---|
| 4,985,836 A | * | 1/1991 | Hashiguchi et al. | 701/90 |
| 5,320,422 A | * | 6/1994 | Tsuyama et al. | 701/90 |
| 5,357,435 A | * | 10/1994 | Yasuda | 701/83 |
| 5,444,625 A | * | 8/1995 | Tanaka et al. | 701/90 |
| 5,636,909 A | * | 6/1997 | Hirao et al. | 701/87 |
| 6,009,967 A | * | 1/2000 | Hrovat | 180/197 |
| 6,151,546 A | * | 11/2000 | Schmitt et al. | 701/84 |

* cited by examiner

*Primary Examiner*—Gary Chin
(74) *Attorney, Agent, or Firm*—Robert M. Sigler

(57) ABSTRACT

A vehicle traction control increases the allowed wheel spin for a driven wheel when (1) sensed vehicle speed is within a predetermined speed range corresponding to near maximum engine speed for the sensed currently used gear of the transmission, (2) sensed vehicle turn curvature is within a predetermined curvature range of zero curvature, (3) sensed vehicle longitudinal acceleration has not been below a predetermined high acceleration for a predetermined time, and (4) sensed vehicle engine speed has not been below a predetermined high engine speed for the predetermined time. The tests are calibrated to provide the increase in a very narrow range of conditions corresponding to high performance operation, and particularly power shifts of a manual shift transmission, on a racetrack with a high coefficient surface.

2 Claims, 3 Drawing Sheets

VEHICLE TRACTION CONTROL WITH POWER SHIFT MODIFICATION

TECHNICAL FIELD

The technical field of this invention is motor vehicle traction control, and particularly to its use in vehicles on racetracks.

BACKGROUND OF THE INVENTION

Vehicle traction controls are used to sense driven wheel slip under powered (non-braking) conditions and control one or both of the vehicle brakes or engine to spin down the driven wheels as necessary to regain traction. But a vehicle involved in high performance operation on a racetrack may lose traction when in a high acceleration state or during gear shift when the new gear is engaged. The wheel spin-up activates the traction control system, which causes a reduction in engine power or a brake activation of the spun-up wheel that reduces vehicle performance at a time when it is most demanded. It is undesirable to merely retune the traction control system to ignore the spin-up, because the action of the traction control system is desirable to handle identical spin-ups encountered in non-controlled maneuvers, particularly in vehicles that may also be operated in normal, off-track driving.

SUMMARY OF THE INVENTION

The apparatus of this invention provides traction control for a vehicle by sensing vehicle speed, the rotational speed of a driven wheel, vehicle longitudinal acceleration; vehicle engine speed, vehicle turn curvature, and a currently used gear of the transmission and increasing the predetermined target delta speed value of the traction control when all of the following are true:

(1) the sensed vehicle speed is within a predetermined speed range corresponding to near maximum engine speed for the sensed currently used gear of the transmission;

(2) the sensed vehicle turn curvature is within a predetermined curvature range of zero curvature;

(3) the sensed vehicle longitudinal acceleration has not been below a predetermined high acceleration for a first predetermined time; and (4) the sensed vehicle engine speed has not been below a predetermined high engine speed for a second predetermined time.

The tests described above are calibrated to provide the increase in a very narrow range of conditions corresponding to high performance operation, and particularly power shifts of a manual shift transmission, on a racetrack with a high coefficient surface.

DESCRIPTION OF THE PREFERRED EMBODIMENT

Figure 1:
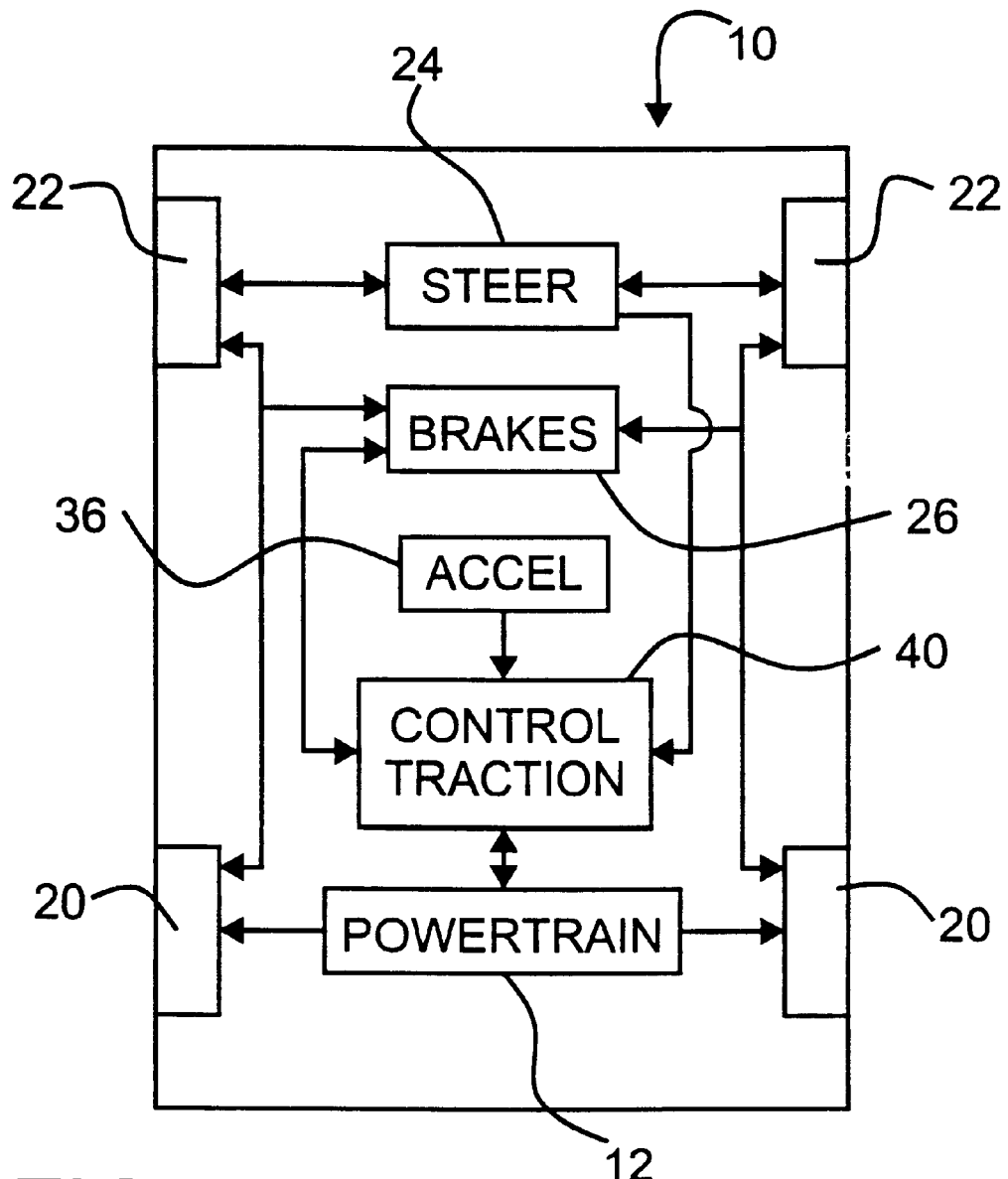
FIG. 1 shows a schematic block diagram of a vehicle with a traction control system according to this invention.

Referring to FIG. 1, a motor vehicle 10 has a powertrain 12 including an engine and transmission for driving a pair of driven wheels 20. Vehicle 10 also has a pair of non-driven wheels 22. One of the sets of driven wheels 20 and non-driven wheels 22 is provided with steering apparatus 24 including a steering control and may include a steering sensor for providing a steer angle signal. A brake system 26 provides a brake control and brake modules at each of the driven wheels 20 and non-driven wheels 22 including a wheel speed sensor, and further provides an indication of the transmission gear in use as calculated from a ratio of engine speed to driven wheel speed. Powertrain 12 is provided with an engine speed sensor.

A traction controller 40 is shown as a separate control but would most likely be included within the control portions of brake system 26, depending on available computer power, ease of input/output connections and other relevant factors known in the art. Regardless of location and packaging, traction controller 40 receives as inputs steering sensor signals from steering apparatus 24, wheel speed sensors sensor signals from brake system 26 and engine speed signals from powertrain 12. An accelerometer 36 may be provided to output a longitudinal acceleration signal. Alternatively, accelerometer 36 and the steering sensor in steering apparatus 24 may be eliminated if traction controller 40 derives a vehicle longitudinal acceleration and a vehicle turn curvature from non-driven wheel speed signals from brake system 26. The outputs of traction controller 40 may be to either or both of powertrain 12 and brake system 26, to provide control through reduction in engine power or application of vehicle brakes, as known in the art.

Figure 2A:
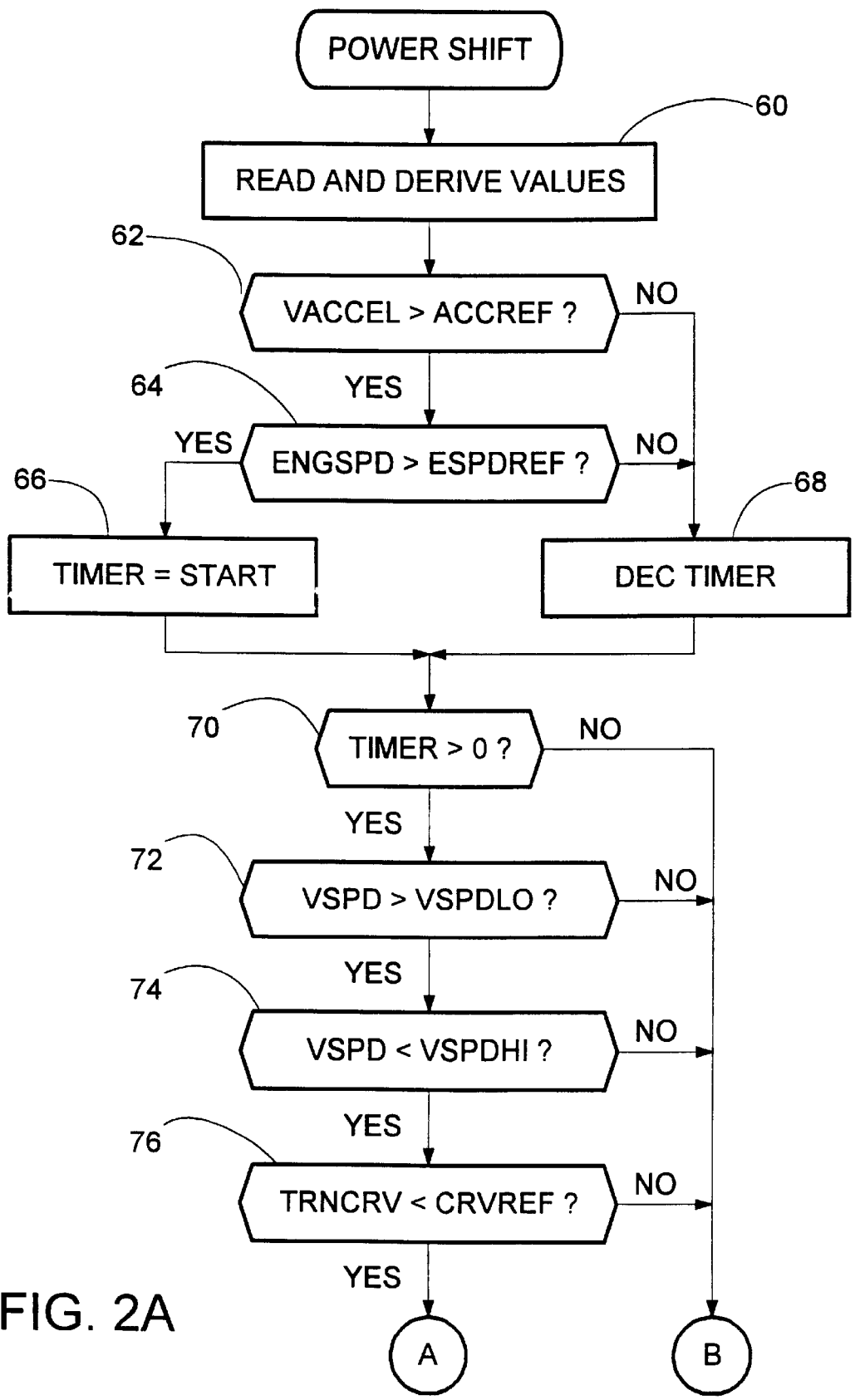
FIGS. 2A and 2B show a flow chart illustrating the operation of the traction control system used in the vehicle of FIG. 1.
Figure 2B:
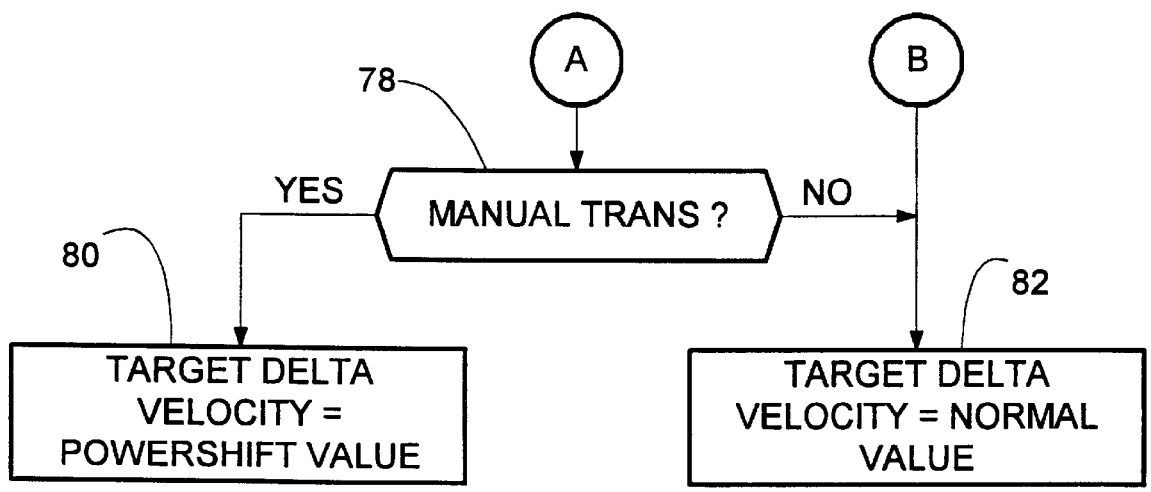

FIG. 2A and 2B show a flow chart illustrating the operation of traction controller 40. Referring to FIG. 2A, program POWER SHIFT begins at step 60 by reading or deriving the vehicle dynamic parameters to be used in the following steps. A vehicle speed value VSPD is derived from the wheel speed signals from sensors on the non-driven wheels. One of the signals, or a combination of the two, may be used as known in the art. A vehicle longitudinal acceleration signal VACCEL may be received from accelerometer 36; but that sensor may be eliminated if VACCEL is derived as the derivative of vehicle speed signal VSPD. An engine speed signal ENGSPD is obtained from powertrain controller 16; and a vehicle turn curvature signal is derived from steering sensor 26 or from a difference in the wheel speed signals of the non-driven wheels, as known in the art.

Having derived the necessary values, the program continues by comparing vehicle acceleration VACCEL at step 62 with a calibrated reference value ACCREF. The calibrated reference ACCREF is sufficiently high that it is not attainable except on a high coefficient (friction) road surface, so that the program will not override normal traction control on wet or other slippery surfaces. If VACCEL is greater, engine speed ENGSPD is compared at step 64 with a calibrated reference value ESPDREF. The calibrated reference ESPDREF is set somewhere near maximum allowable speed, or "red line" speed, for the engine: for example, about 500 RPM lower. If ENGSPD is greater, a timer value TIMER is set to a value START at step 66. If either of steps 62 and 64 results in a lesser value, the program alternatively decrements TIMER at step 68. Since the reference values ACCREF and ESPDREF are very high in the ranges for acceleration and engine speed, respectively, they are rarely found, especially simultaneously, except under racing conditions at a high speed track in dry weather.

From either of steps 66 and 68, the program proceeds to test TIMER at step 70. If the timer has timed out, the program proceeds to 82 and either calls for or fails to override the normal target delta velocity of the wheel in traction control: thus traction control operates to bring the wheel speed of the spun up wheel down to its desired speed to regain its traction. But, due to the action of step 66, which repeatedly restarts the timer at the full value START on every loop in which engine speed ESPD and vehicle longitudinal acceleration VACCEL both exceed their references, the remainder of the program will be activated as long as those conditions prevail and for a time thereafter determined by the value of START and the loop rate of the program. The values are set so that, as a gear shift occurs, the action of the remainder of the program, to be described below, will not end immediately as the acceleration or engine speed drops during the shift. Thus, the value of START is set to provide a timer duration related to the expected length of a shift in gear.

From step 70 the program determines if vehicle speed VSPD is in a range above the normal driving speed for the transmission gear in use, and preferably near the maximum or "red line" speed for the gear. The range is set by two calibrated references: VSPDHI, which is set at a vehicle speed corresponding to about maximum or "red line" engine speed for the gear, and VSPDLO, which is set to a vehicle speed corresponding to a calibrated speed somewhat lower. Step 72 determines if vehicle speed VSPD is greater than the low reference VSPDLO; and step 74 determines if VSPD is less than the upper reference VSPDHI. Together, steps 72 and 74 determine if the vehicle speed is within the predetermined range. During the shift, while the acceleration and/or engine speed temporarily drop with the removal of power from the driving wheels, the vehicle speed does not ordinarily fall. Therefore, an engine speed straying out of this range is a signal that the traction control should probably not be overridden. In addition, it should be noted that the vehicle speed references VSPDLO and VSPDHI will be different for each gear of powertrain 12. Typically, the overriding of traction control will only be allowed in shifts from lower gears—for example, from $1^{st}$ or $2^{nd}$ gear in a manual 4 speed transmission. Values are stored for each of those shifts and are chosen during program operation on the basis of the sense transmission. For higher gears, the calibrated values may be reversed in size to prevent traction control overriding action of the program.

If steps 72 and 74 determine that vehicle speed is in the proper range, step 76 determines if the vehicle is being steered for straight driving. If not, overriding traction control is probably not a good idea. Thus, step 76 compares the turn curvature of the vehicle TRNCRV with a reference value CRVREF, that defines a very narrow angle range around straight ahead. Typically, the turn curvature is expressed in degrees of steering angle, with zero nominally defined as straight. Thus, the reference value stored would be positive, and the value compared would be an absolute value, since the direction of any turn doesn't really matter.

Proceeding to FIG. 2B, the program determines at step 78 if the vehicle has a manual transmission, which information may be stored in memory. This test is not necessary except with vehicles that may be equipped with either manual or automatic transmissions. The benefits of the system of this invention are mostly obtained in manual shift vehicles.

If each of the tests of steps 70–78 produces a yes answer, the program substitutes a calibrated TARGET DELTA VELOCITY that is significantly higher than the normal value of the traction control system for the driven wheel that is in traction control. With a higher TARGET DELTA VELOCITY, the traction control will allow a higher wheel spin, and thus potentially greater power transfer at the tire/track interface. The value is calibratable to provide a desired combination of power transfer and traction.

What is claimed is:

1. A traction control for a vehicle with an engine and a transmission driving a driven wheel comprising:

means for sensing vehicle speed;

means for sensing the rotational speed of the driven wheel;

means for providing speed reduction of the driven vehicle wheel when the sensed rotational speed thereof exceeds a first predetermined target delta speed value above the sensed vehicle speed;

means for sensing vehicle longitudinal acceleration;

means for sensing vehicle engine speed;

means for sensing vehicle turn curvature;

means for sensing a currently used gear of the transmission;

means for substituting a second predetermined target delta speed value, greater than the first target delta speed value, for the first predetermined target delta speed value when all of the following are true:

(1) the sensed vehicle speed is within a predetermined speed range corresponding to near maximum engine speed for the sensed currently used gear of the transmission;

(2) the sensed vehicle turn curvature is within a predetermined curvature range of zero curvature;

(3) the sensed vehicle longitudinal acceleration has not been below a predetermined high acceleration for a first predetermined time; and (4) the sensed vehicle engine speed has not been below a predetermined high engine speed for a second predetermined time.

2. The method of claim 1 wherein the predetermined high acceleration can only be achieved on a high coefficient road surface, the predetermined high engine speed corresponds to an engine speed near the maximum allowable engine speed for the gear in use, and the first predetermined time and the second predetermined time are equal.

* * * * *